(12) United States Patent
Ikeda et al.

(10) Patent No.: US 7,421,655 B2
(45) Date of Patent: Sep. 2, 2008

(54) PRESENTING INFORMATION INDICATING INPUT MODALITIES

(75) Inventors: Hiromi Ikeda, Kanagawa (JP); Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 10/885,662

(22) Filed: Jul. 8, 2004

(65) Prior Publication Data

US 2005/0018658 A1 Jan. 27, 2005

(30) Foreign Application Priority Data

Jul. 10, 2003 (JP) ............................. 2003-194888

(51) Int. Cl.
*G06F 3/00* (2006.01)
*G06F 3/16* (2006.01)
*G06F 3/048* (2006.01)
*G06F 7/00* (2006.01)

(52) U.S. Cl. ........................ 715/710; 715/728; 715/744; 715/835; 707/104.1

(58) Field of Classification Search ................. 715/744, 715/710, 728, 835; 707/104.1
See application file for complete search history.

(56) References Cited

U.S. PATENT DOCUMENTS

| | | | | |
|---|---|---|---|---|
| 5,715,444 A | * | 2/1998 | Danish et al. ................... | 707/4 |
| 6,510,243 B1 | | 1/2003 | Ikeda | |
| 2002/0171685 A1 | | 11/2002 | Christianson et al. | |
| 2003/0063129 A1 | | 4/2003 | Smyth et al. | |
| 2003/0065604 A1 | * | 4/2003 | Gatto ........................... | 705/36 |
| 2003/0065605 A1 | * | 4/2003 | Gatto ........................... | 705/36 |
| 2003/0117365 A1 | | 6/2003 | Shteyn | |
| 2003/0135429 A1 | * | 7/2003 | Pous et al. ..................... | 705/27 |
| 2004/0128012 A1 | * | 7/2004 | Lin .............................. | 700/100 |

FOREIGN PATENT DOCUMENTS

| | | |
|---|---|---|
| JP | 63-066623 | 3/1988 |
| JP | 7-104962 | 4/1995 |
| JP | 7-110751 | 4/1995 |
| JP | 8-95734 | 4/1996 |
| JP | 10-188103 | 7/1998 |
| JP | 11-288342 | 10/1999 |
| JP | 2001-154852 | 6/2001 |
| JP | 2001-216129 | 8/2001 |
| WO | WO 01/63514 | 8/2001 |
| WO | WO 01/96994 | 12/2001 |

* cited by examiner

*Primary Examiner*—Tadesse Hailu
*Assistant Examiner*—Ting Zhou
(74) *Attorney, Agent, or Firm*—Fitzpatrick, Cella, Harper & Scinto

(57) ABSTRACT

M_IDs corresponding to "not available" and "recommended 1" in respective setup items are read, and images corresponding to "recommended 1" and "not available" are read (S803). An image indicating "not available" and that indicating "recommended 1" corresponding to respective setup items are displayed at neighboring positions of GUI components of the respective setup items displayed on the display screen (S804).

9 Claims, 15 Drawing Sheets

| SETUP ITEM | | OPERATION COUNT | | OPERATION TIME | | OPERATION SEQUENCE | | AVAILABLE | NOT AVAILABLE | RECOMMENDED 1 | RECOMMENDED 2 | SPEECH RECOGNITION LEXICAL ITEM |
|---|---|---|---|---|---|---|---|---|---|---|---|---|
| | | M0 | M2 | M0 | M2 | M0 | M2 | | | | | |
| WHITE BALANCE | AUTO | 7 | 2 | 6 | 2 | S011 | S021 | M0, M2 | M1 | M2 | M0 | AUTO WHITE BALANCE |
| | SUNLIGHT | 8 | 2 | 9 | 2 | S111 | S121 | M0, M2 | M1 | M2 | M0 | SUNLIGHT |
| | CLOUDY | 9 | 2 | 10 | 2 | S211 | S221 | M0, M2 | M1 | M2 | M0 | CLOUDY |
| | ... | ... | ... | ... | ... | ... | ... | ... | ... | ... | ... | ... |
| STROBE | | ... | ... | ... | ... | ... | ... | M0, M2 | M1 | M0 | M2 | ... |
| EXPOSURE CORRECTION | | ... | ... | ... | ... | ... | ... | M0, M2 | M1 | M0 | M2 | ... |
| ... | | ... | ... | ... | ... | ... | ... | ... | ... | ... | ... | ... |

FIG. 2

|  | USER ID | TABLE |
|---|---|---|
| COMMON TO ALL USERS | 00000 | T0 |
| USER 1 | 00001 | T1 |
| USER 2 | 00002 | T2 |
| ... | ... | ... |

FIG. 3

| INPUT MODALITY | M_ID | IMAGE | | | SPEECH MESSAGE | | |
|---|---|---|---|---|---|---|---|
| | | RECOMMENDED | AVAILABLE | NOT AVAILABLE | RECOMMENDED | AVAILABLE | NOT AVAILABLE |
| HARD KEY | M0 | h.gif | h_y.gif | h_n.gif | h.txt | h_y.txt | h_n.txt |
| GUI | M1 | g.gif | g_y.gif | g_n.gif | g.txt | g_y.txt | g_n.txt |
| SPEECH | M2 | v.gif | v_y.gif | v_n.gif | v.txt | v_y.txt | v_n.txt |
| | ... | ... | ... | ... | ... | ... | ... |

FIG. 4

| SETUP ITEM | | OPERATION COUNT | | OPERATION TIME | | OPERATION SEQUENCE | | AVAILABLE | NOT AVAILABLE | RECOMMENDED 1 | RECOMMENDED 2 | SPEECH RECOGNITION LEXICAL ITEM |
|---|---|---|---|---|---|---|---|---|---|---|---|---|
| | | M1 | M2 | M1 | M2 | M1 | M2 | | | | | |
| PAPER SHEET | AUTO | 3 | 2 | 7 | 3 | L011 | L021 | M1, M2 | M0 | M2 | M1 | AUTO PAPER |
| | A4 | 3 | 2 | 7 | 3 | L111 | L121 | M1, M2 | M0 | M2 | M1 | A4 |
| | A3 | 3 | 2 | 7 | 3 | L211 | L221 | M1, M2 | M0 | M2 | M1 | A3 |
| | ... | ... | ... | ... | ... | ... | ... | ... | ... | ... | ... | ... |
| COPY COUNT | | — | — | — | — | ... | ... | M0 | M1, M2 | M0 | — | ... |
| SORTER | ... | ... | ... | ... | ... | ... | ... | M1, M2 | M0 | M1 | M2 | ... |
| EQUAL MAGNIFICATION | EQUAL MAGNIFICATION | ... | ... | ... | ... | ... | ... | ... | ... | M1 | M2 | ... |
| | 100 | | | | | | | | | | | |
| MAGNIFICATION | 99 | | | | | | | | | M2 | M1 | |
| | ...... | | | | | | | | | | | |

FIG. 5

| SETUP SEQUENCE | OPERATION 1 | OPERATION 2 | OPERATION 3 | ⋮ |
|---|---|---|---|---|
| L011 | PAPER_BUTTON_PRESS | AUTO_BUTTON_PRESS | CLOSE_BUTTON_PRESS | ⋮ |
| ⋮ | ⋮ | ⋮ | ⋮ | ⋮ |
| L111 | PAPER_BUTTON_PRESS | A4_BUTTON_PRESS | CLOSE_BUTTON_PRESS | ⋮ |
| ⋮ | ⋮ | ⋮ | ⋮ | ⋮ |
| L021 | VOICE_BUTTON_PRESS | SPEECH_IN_AUTOPAPER | — | — |
| ⋮ | ⋮ | ⋮ | ⋮ | ⋮ |

FIG. 13

| SETUP ITEM | | OPERATION COUNT | | OPERATION TIME | | OPERATION SEQUENCE | | AVAILABLE | NOT AVAILABLE | RECOMMENDED 1 | RECOMMENDED 2 | SPEECH RECOGNITION LEXICAL ITEM |
|---|---|---|---|---|---|---|---|---|---|---|---|---|
| | | M0 | M2 | M0 | M2 | M0 | M2 | | | | | |
| WHITE BALANCE | AUTO | 7 | 2 | 6 | 2 | S011 | S021 | M0, M2 | M1 | M2 | M0 | AUTO WHITE BALANCE |
| | SUNLIGHT | 8 | 2 | 9 | 2 | S111 | S121 | M0, M2 | M1 | M2 | M0 | SUNLIGHT |
| | CLOUDY | 9 | 2 | 10 | 2 | S211 | S221 | M0, M2 | M1 | M2 | M0 | CLOUDY |
| | ⋮ | ⋮ | ⋮ | ⋮ | ⋮ | ⋮ | ⋮ | ⋮ | ⋮ | ⋮ | ⋮ | ⋮ |
| STROBE | ⋮ | ⋮ | ⋮ | ⋮ | ⋮ | ⋮ | ⋮ | M0, M2 | M1 | M0 | M2 | ⋮ |
| EXPOSURE CORRECTION | ⋮ | ⋮ | ⋮ | ⋮ | ⋮ | ⋮ | ⋮ | M0, M2 | M1 | M0 | M2 | ⋮ |
| ⋮ | | | | | | | | ⋮ | ⋮ | ⋮ | ⋮ | ⋮ |

… 
PRESENTING INFORMATION INDICATING INPUT MODALITIES

CLAIM OF PRIORITY

This application claims priority from Japanese Patent Application No. 2003-194888 filed on Jul. 10, 2003, the entire contents of which are incorporated herein by reference.

FIELD OF THE INVENTION

The present invention relates to a technique associated with a multimodal user interface.

BACKGROUND OF THE INVENTION

A multimodal user interface which allows the user to input using one of a plurality of types of modalities of his or her choice such as a GUI input, speech input, and the like is very convenient for the user.

Conventionally, some techniques using a multimodal interface having a plurality of modalities have been proposed (for example, see Japanese Patent Laid-Open Nos. 8-95734, 11-288342, and 2001-154852).

However, it is difficult for the user to determine which of input modalities can be used to input, or which of input modalities is suited to information to be input.

SUMMARY OF THE INVENTION

The present invention has been made in consideration of the aforementioned problems, and has as its object to provide a technique that allows the user to input information more easily upon inputting information using a multimodal user interface.

In order to achieve the above object, for example, an information processing method of the present invention comprises the following arrangement.

That is, an information processing method, which is executed by an information processing apparatus that can make inputs by means of respective input modalities, comprises:

a read step of reading out use information from a storage which stores use information associated with use of respective input modalities corresponding to a predetermined process of the information processing apparatus; and an output step of outputting information associated with states of use of respective modalities corresponding to the predetermined process on the basis of the use information read out in the read step.

In order to achieve the above object, for example, an information processing apparatus of the present invention comprises the following arrangement.

That is, an information processing apparatus that can make inputs by means of respective input modalities, comprises:

read means for reading out use information from a storage which stores use information associated with use of respective input modalities corresponding to a predetermined process of the information processing apparatus; and output means for outputting information associated with states of use of respective modalities corresponding to the predetermined process on the basis of the use information read out by the read means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of the configuration of a table that registers a plurality of sets of user IDs and corresponding table IDs;

FIG. 3 shows an example of the configuration of a table corresponding to each individual table ID;

FIG. 4 shows an example of the configuration of a new table to be stored in a storage unit 103 when the information processing apparatus according to the first embodiment of the present invention is applied to a copying machine;

FIG. 5 shows step names of operation sequences in respective setup items, which are registered by an application developer like "operation 1", "operation 2", "operation 3", . . . ;

FIG. 13 shows an example of the configuration of a new table to be stored in the storage unit 103 when the information processing apparatus according to the fifth embodiment of the present invention is applied to a digital camera;

DETAILED DESCRIPTION OF THE PREFERRED EMBODIMENTS

Preferred embodiments of the present invention will now be described in detail in accordance with the accompanying drawings.

First Embodiment

Figure 1:
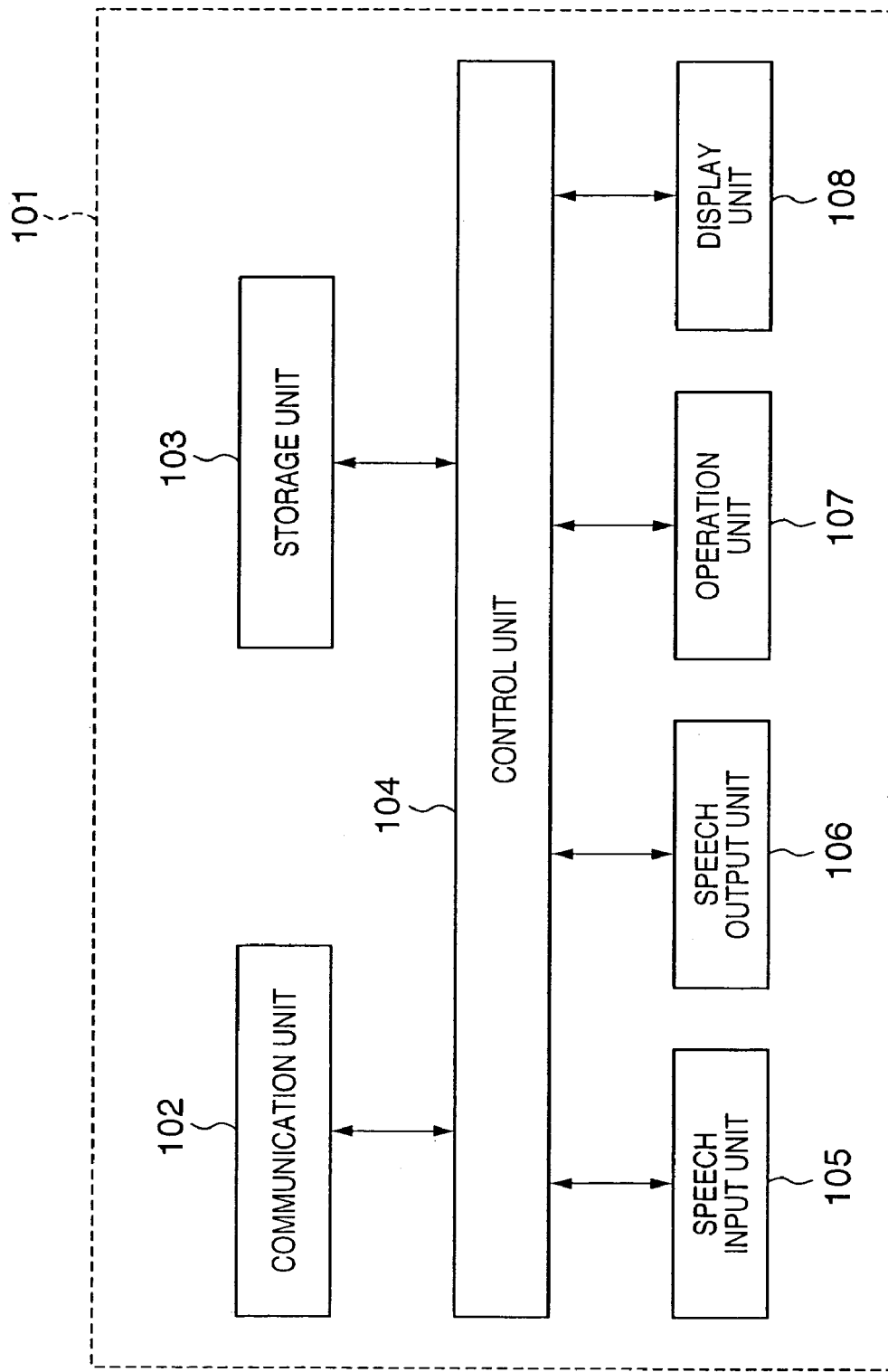
FIG. 1 is a block diagram showing the basic arrangement of an information processing apparatus according to the first embodiment of the present invention.

FIG. 1 shows the basic arrangement of an information processing apparatus according to this embodiment. An information processing apparatus 101 comprises a communication unit 102, storage unit 103, control unit 104, speech input unit 105, speech output unit 106, operation unit 107, and display unit 108.

The communication unit 102 is a network interface which is used to make data communications with other apparatuses via a network such as the Internet, LAN, or the like. The storage unit 103 comprises a hard disk drive device for saving various kinds of information, and storage media such as a CD-ROM, DVD-ROM, and the like used to provide various kinds of information to the information processing apparatus 101, and the like. The hard disk drive device and storage media store various application programs, a user interface control program, a text interpretation program, a speech recognition result storage area, operation log information, various data required upon executing these programs, and the like. These programs and data are loaded by this apparatus under the control of the control unit 104.

The control unit 104 comprises a work memory, CPU, MPU, and the like, and executes various processes by reading out programs and data stored in the storage unit 103. The speech input unit 105 comprises a microphone, A/D converter, and the like. The speech input unit 105 executes a process for receiving user's speech as an analog signal, converting it into a digital signal, and outputting the digital signal to the work memory of the control unit 104.

The speech output unit 106 comprises a loudspeaker, headphone, D/A converter, and the like. The speech output unit 106 executes a process for D/A-converting a speech signal according to speech data and externally outputting the converted signal as sound. The operation unit 107 comprises input devices such as a button group, keyboard, mouse, touch panel, pen, tablet, and the like, and serves as an input interface used to input various instructions to this apparatus. The display unit 108 comprises a display device such as a liquid crystal display or the like, and displays various kinds of information including icons, text, and the like.

Note that a touch panel type display device may be used as the display unit 108. In this case, the display unit 108 also has a function of the operation unit 107 (i.e., a function of inputting various instructions to this apparatus). Therefore, when the display unit 108 comprises a touch panel type display device, all descriptions "operate the operation unit 107" should be read as "operation on the display unit 108".

The processes to be executed by the information processing apparatus with the aforementioned arrangement will be described below. FIG. 2 shows an example of the configuration of a table that registers a plurality of sets of user IDs and corresponding table IDs. FIG. 3 shows an example of the configuration of a table corresponding to this table ID.

In the table shown in FIG. 3, an "input modality" column describes a plurality of types of input modalities used to input information to this apparatus. FIG. 3 shows "hard key" (an actual button provided to the operation unit 107), "GUI" (a GUI displayed on the display unit 108), and "speech" (speech input using the speech input unit 105). Each input modality is assigned with an ID (M_ID).

In order to present to the user whether or not respective input modalities are available in various cases to be described later, and whether or not each individual input modality is a recommended one if it is available, by means of image display on the display unit 108 and speech output from the speech output unit 106, the table shown in FIG. 3 describes respective image data file names in an "image" column and utterance content text file names in a "speech message" column.

For example, assuming that an input modality is "GUI", if this input modality is available, an image with an image file name "g_y.gif" is displayed on the display unit 107, and synthetic speech generated according to an utterance content text file name "g_y.txt" is output from the speech output unit 106. If this input modality is not available, an image with an image file name "g_n.gif" is displayed on the display unit 107, and synthetic speech generated according to an utterance content text file name "g_n.txt" is output from the speech output unit 106. Also, if this input modality is a recommended one, an image with an image file name "g.gif" is displayed on the display unit 107, and synthetic speech generated according to an utterance content text file name "g.txt" is output from the speech output unit 106.

As described above, the table shown in FIG. 3 is assured for each table ID. Therefore, different images and utterance contents corresponding to respective input modalities can be set for respective users. This effect will be explained later in another embodiment.

Note that the data of the tables shown in FIG. 2 and 3, and image data and text data corresponding to the image file names and utterance content text file names described in the table shown in FIG. 3 are stored in the storage unit 103.

In this embodiment, a speech synthesis process is done according to text data and speech as the speech synthesis result is output so as to output speech from the speech output unit 106. However, the present invention is not limited to this. For example, the table shown in FIG. 3 may describe speech data file names of the utterance contents in a "speech message" column, and speech data corresponding to the file names may be stored in the storage unit 103. In this case, the need for a speech synthesis process can be obviated.

In this embodiment, the table IDs are set for respective user IDs. However, the present invention is not limited to this, and the table IDs may be set for respective user attributes or skill levels. In the following description, the user ID is set to be "0" to use a table (table T0) common to all users for the sake of simplicity (hence, the table shown in FIG. 3 and a table shown in FIG. 4 to be described below are common to all the users). In the following description, the information processing apparatus according to this embodiment is applied to a copying machine. In this case, the arrangement shown in FIG. 1 indicates that other than a portion which is used to actually make a copy process in the copying machine.

FIG. 4 shows an example of the configuration of a new table to be stored in the storage unit 103 when the information processing apparatus according to this embodiment is applied to the copying machine. The table shown in FIG. 4 describes "setup item" of the copying machine, and "operation count", "operation time", "operation sequence", "available", "not available", "recommend 1", "recommend 2", and "speech recognition lexical item" for each setup item. This table will be described in more detail below using FIG. 4.

The "setup item" column indicates the contents that can be operated in the copying machine, and include "paper sheet" (an item for setting the size of a paper sheet as a copy destination), "copy count" (an item for setting the number of copies), and the like.

Each of the "operation count", "operation time", and "operation sequence" columns is further divided into "M1" and "M2" columns. Note that M1 and M2 respectively correspond to input modality IDs (M_IDs) shown in FIG. 3. Hence, in FIG. 4, each of the "operation count", "operation time", and "operation sequence" columns indicates those of "GUI" and "speech".

The "operation count", "operation time", and "operation sequence" columns will be explained below.

The "operation count" column indicates the number of steps (step count) which form an operation sequence required to attain an operation described in the "setup item" column. For example, when a setup is made to copy on an "A4" paper sheet, and M_ID=M1 (input modality =GUI), the setup is completed in three steps.

The "operation time" column indicates a time required to attain each operation described in the "setup item" column. For example, when a setup is made to copy on an "A4" paper sheet, and M_ID=M1 (input modality=GUI), the setup is completed in 7 (a unit may be either "sec" or "min").

The "operation sequence" column indicates the most recommended operation sequence of those registered in the table of FIG. 5 upon making setups described in the "setup item" column using respective modalities. For example, when a setup is made to copy on an "A4" paper sheet using GUI (M_ID=M1), an operation sequence indicated by L111 is the most recommended one. This "most recommended" is determined by the application developer in advance in consideration of the operation count, operation time, and the like.

FIG. 5 shows step names of the operation sequence of each setup item, which are registered in advance by the application developer like "operation 1", "operation 2", "operation 3", . . . . In FIG. 5, a "setup item" column describes symbols which represent respective operation sequences, and correspond to those in the "operation sequence" column in FIG. 4.

Therefore, for example, when a setup is made to copy on an "A4" paper sheet, and M_ID=M1 (input modality=GUI), an operation sequence indicated by L111 is recommended. That is, an operation sequence in three steps "PAPER_BUTTON_PRESS", "A4_BUTTON_PRESS", and "CLOSE_BUTTON_PRESS" is recommended. Assume that the data of the table shown in FIG. 5 are pre-stored in the storage unit 103.

Referring back to FIG. 4, "available" indicates available input modalities of each "setup item". For example, input modalities, which can be used to input upon making a setup for copying on an "A4" paper sheet, are those indicated by M1 and M2. In other words, only "GUI" and "speech" can be used to make a setup for copying on an "A4" paper sheet.

"Not available" indicate input modalities which are not available for each "setup item". For example, an input modality which cannot be used to input upon making a setup for copying on an "A4" paper sheet, is that indicated by M0. That is, a setup for copying on an "A4" paper sheet cannot be made using "hard key".

"Recommended 1" indicates the most recommended input modality (the most recommended input modality determined by the application developer) in each "setup item". For example, an input modality which is most recommended upon making a setup for copying on an "A4 paper sheet is M2. That is, it is most recommended to input the setup in an operation sequence L121 by "speech". This "most recommended" is determined by the application developer in advance in consideration of the operation count, operation time, and the like.

"Recommended 2" indicates the second most recommended input modality (the second most recommended input modality determined by the application developer) in each "setup item". For example, an input modality which is second most recommended upon making a setup for copying on an "A4 paper sheet is M1. That is, it is second most recommended to input the setup in an operation sequence L111 by "GUI". This "second most recommended" is also determined in the same manner as "most recommended".

In this way, use information, which is information associated with use of respective input modalities for respective setup items, is registered in the table shown in FIG. 4.

"Speech recognition lexical item" indicates a lexical item to be recognized upon making a speech input. For example, when a setup for copying on an "A4 paper sheet is made by a speech input, a word "A4" must be registered in advance as "speech recognition lexical item" in the table in FIG. 4. Therefore, this "speech recognition lexical item" column describes lexical items to be recognized by the control unit 104 when each "setup item" is input by speech.

Note that a plurality of lexical items "A4 paper sheet", "paper sheet of A4", and the like may be registered in "speech recognition lexical item" together with "A4". Also, a lexical item itself need not always be registered, but the name of a file that describes a grammar or lexicon for speech recognition may be registered. In this case, the control unit 104 recognizes a lexical item described in the registered file, or recognizes a lexical item according to a grammar if the grammar is described in the file.

The table shown in FIG. 4 is assured for each table ID as in the table shown in FIG. 3. Therefore, different contents of "operation count", "operation time", "operation sequence", "available", "not available", "recommended 1", "recommended 2", and "speech recognition lexical item" for each "setup item" can be set for each user. This effect will be described later in another embodiment.

Assume that the data of the tables shown in FIGS. 4 and 5 mentioned above are prepared in advance and are stored in the storage unit 103.

Information which is to be displayed on a window that is displayed on the display unit 108 according to the table shown in FIG. 4 and is used to make copy and various other setups will be described below.

Figure 6:
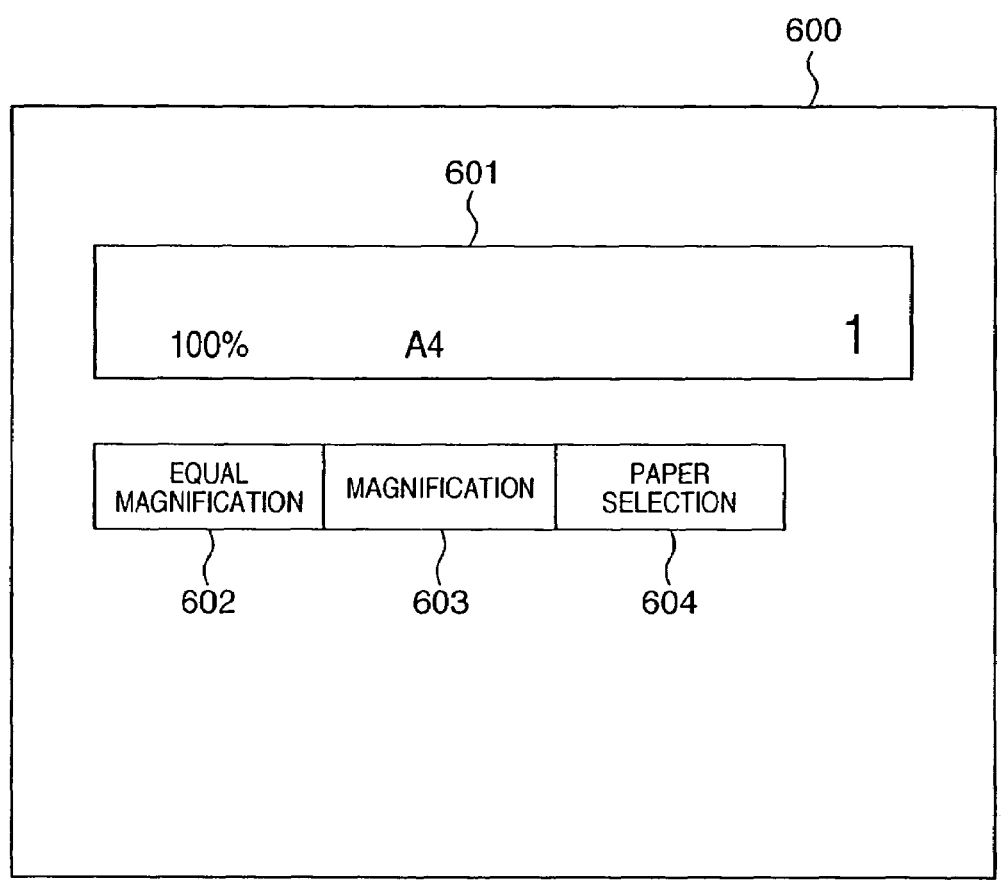
FIG. 6 shows a simple window which is displayed on a display screen of a display unit of a conventional copying machine with a multimodal user interface and is used to make copy and various other setups.

FIG. 6 shows a simple window which is displayed on a display screen of a display unit of a conventional copying machine with a multimodal user interface and is used to make copy and various other setups. A display screen 600 displays an area 601 that displays the currently set information values (the currently set magnification, paper size, and copy count are displayed in turn from the left on the area), an equal-magnification setting button 602, a magnification setting button 603, and a paper setting button 604. Since the screen shown in FIG. 6 is of a touch panel type, when the user designates each button icon position with the finger, the control unit 104 executes a process corresponding to the designated button.

In the conventional copying machine with the multimodal user interface, the user makes various setups by operating respective buttons, by a speech input, or by a combination of a button operation and speech input. However, it is difficult for the user to determine from this screen which of input modalities is easier and quicker to make a setup.

Figure 7:
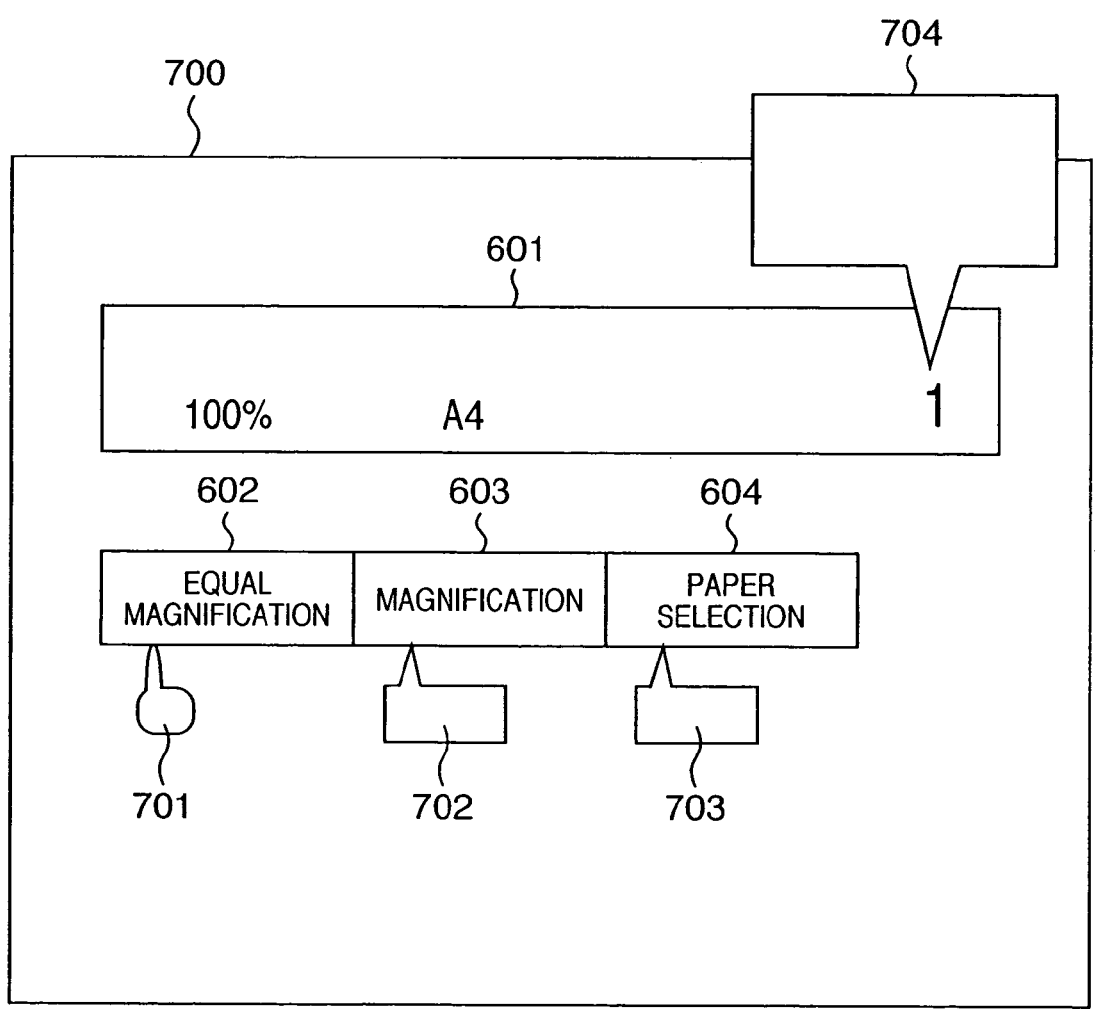
FIG. 7 shows a simple window which is displayed on a display screen of a display unit 108 of the copying machine to which the information processing apparatus according to the first embodiment of the present invention is applied, and is used to make copy and various other setups.

FIG. 7 shows a simple window which is displayed on the display screen of the display unit 108 of the copying machine to which the information processing apparatus according to the first embodiment of the present invention is applied, and is used to make copy and various other setups. The same reference numerals in FIG. 7 denote the same parts as in FIG. 6, and a description thereof will be omitted. A screen 700 in FIG. 7 displays images 701, 702, and 703 which indicate most recommended modalities upon making an equal-magnification setup, magnification setup, and paper setup. Also, upon making a copy count setup, an image 704 which indicates an unavailable input modality is displayed.

The image 701 (an image representing "hand") indicates that the recommended input modality is a GUI, and each of the images 702 and 703 (images representing "speech balloon") indicates that the recommended input modality is speech. The image 704 (an image of a speech balloon on which X is superposed) indicates that an unavailable input modality is speech.

The images 701 to 703 shown in FIG. 7 are implemented by referring to the contents of "recommended 1" in the columns of the setup items "equal magnification", "magnification", and "paper selection" in the table shown in FIG. 4, and specifying and displaying images corresponding to the respective M_IDs (the image 701 when M_ID=M1, the image 702 (703) when M_ID=M2) from the table shown in FIG. 3. Assume that data of the images 701 to 703 are pre-stored in the storage unit 103.

Note that the image 704 shown in FIG. 7 is implemented by referring to the contents corresponding to "not available" in the setup item "copy count" in the table shown in FIG. 4, and specifying an image corresponding to M_ID (there are two modalities, M1 and M2, only M2 is adopted in FIG. 7, but M1 or both M1 and M2 may be adopted) from the table shown in FIG. 3. Note that the data of the image 704 is pre-stored in the storage unit 103.

Note that images indicating unavailable input modalities may also be displayed for other items on the screen. For example, since the M_ID corresponding to "not available" of the setup item "paper sheet" is M0, an image indicating "hard key is not available" is displayed in the vicinity of the image of the button 604.

In this manner, by displaying the images indicating the most recommended input modalities with reference to FIG. 4, the user can recognize which of input modalities is available upon making each setup. In addition, if a plurality of different input modalities are available, the user can recognize which of input modalities is most recommended.

In this embodiment, images indicating the most recommended input modalities are displayed. However, the present invention is not limited to this. For example, images indicating the second most recommended input modalities (input modalities corresponding to the M_IDs of "recommended 2") may be displayed. When images indicating the most recommended input modalities, those indicating the second most recommended input modalities, and those indicating unavailable input modalities are displayed on a single screen, a method that allows the user to intuitively recognize these modalities may be adopted: for example, images indicating the most recommended input modalities, those indicating the second most recommended input modalities, and those indicating unavailable input modalities may be displayed while reducing their display scales in turn.

Figure 8:
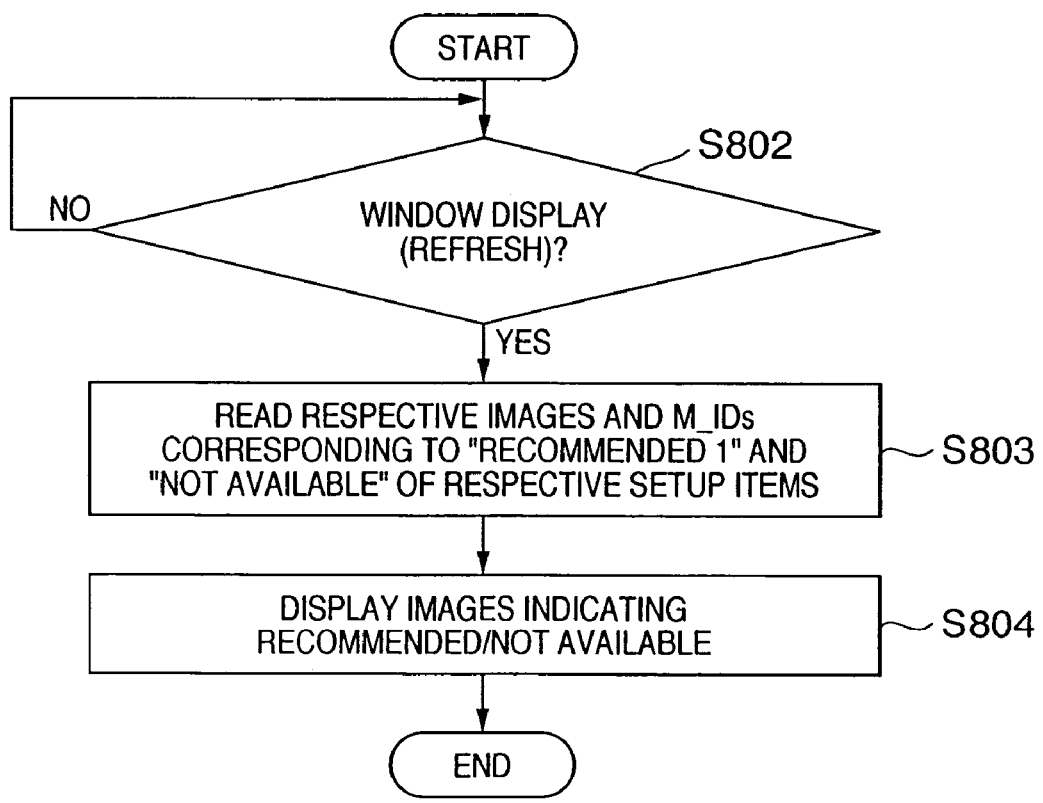
FIG. 8 is a flowchart of a process to be executed by the copying machine to which the information processing apparatus according to the first embodiment of the present invention is applied.

FIG. 8 is a flowchart of the process executed by the aforementioned copying machine. Note that a program according to the flowchart shown in FIG. 8 is saved in the storage unit 103, and this copying machine implements the process according to the flowchart of FIG. 8 when the control unit 104 reads out and executes that program onto its own work area.

Assume that the process shown in FIG. 8 is executed as a subroutine of a main process, and the window used to make copy and various other setups (e.g., that shown in FIG. 6) is already displayed on the display screen of the display unit 108.

Upon displaying the window or reloading (refreshing) the window on the display unit 108 (step S802), the M_IDs corresponding to "not available" and "recommended 1" in respective setup items are read from the table shown in FIG. 4 stored in the storage unit 103, and images corresponding to "recommended 1" and "not available" of those described in the table shown in FIG. 3 are read (step S803).

Images indicating "not available" and those indicating "recommended 1" corresponding to respective setup items are displayed near the GUI components of the respective setup items displayed on the display screen of the display unit 108 (step S804). With the above process, for example, the window shown in FIG. 7 is displayed on the display screen of the display unit 108.

Note that the above process presents the recommended input modalities and unavailable input modalities to the user by means of image display but may present them by means of speech. In this case, the following processes are made in steps S803 and S804 in the flowchart shown in FIG. 8.

In step S803, the M_IDs and speech recognition lexical items corresponding to "not available" and "recommended 1" in respective setup items are read from the table shown in FIG. 4 stored in the storage unit 103, and text data corresponding to "recommended 1" and "not available" of speech messages described in the table shown in FIG. 3 are read (step S803).

Speech data indicating "not available" and those indicating "recommended 1" corresponding to respective setup items are output as speech synthesis results according to the text data (step S804). As the speech contents, for example, "GUI is recommended for equal-magnification setup, speech is recommended for magnification setup, . . . " may be output.

As described above, according to the first embodiment, since recommended input modalities are presented to the user by means of display and speech, the user can easily make an operation by selectively using the input modalities.

Note that any of a plurality of modalities of the multimodal user interface may be used in some cases. Also, a plurality of modalities may be used in combination. For example, the user may make a speech input "from here to there" while clicking two points on a map displayed on the display. In this case, a combination of two modalities (GUI+speech) must be presented to the user as recommended modalities.

Second Embodiment

In the first embodiment, recommended input modalities and unavailable input modalities are presented to the user using the tables (FIGS. 3 and 4) common to all the users. This embodiment will exemplify a case wherein the tables for each individual user are used. In such case, the tables shown in FIGS. 3 and 4 are assured for each user. Note that this embodiment is substantially the same as the first embodiment, except that the tables are assured for respective users, and different presentations are made for those users.

In this embodiment, assume that the user inputs an ID assigned to him or her using the operation unit 107 upon using the information processing apparatus. As a result, the control unit 104 refers to the table shown in FIG. 2 to specify the corresponding table ID, i.e., to specify the tables to be used. Note that the method of specifying tables to be used is not limited to such specific method. For example, the following method is available.

Information unique to a person such as a fingerprint pattern, fundus pattern, or the like of each individual user is stored in advance in the information processing apparatus in correspondence with the user ID, and a device (personal information reader) for reading the personal information from the finger or eye of the user and inputting that information to the information processing apparatus is connected to the information processing apparatus. The user who uses the information processing apparatus makes the personal information reader read his or her personal information, and inputs it to the information processing apparatus. The information processing apparatus identifies the input personal information and matches it with the held ones of respective users, thereby specifying a table ID corresponding to the user ID of the matched user.

Then, the apparatus displays a different display window for each user on the display screen of the display unit 108 using data of the table corresponding to the determined table ID.

Figure 9:
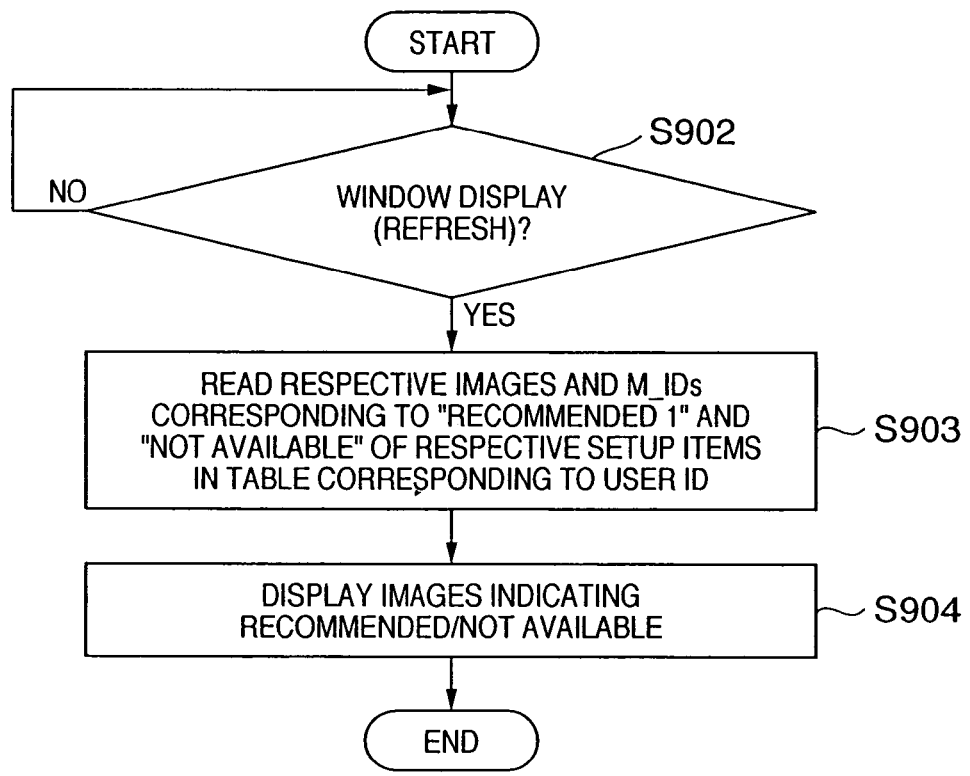
FIG. 9 is a flowchart of a process for displaying windows used to make copy and various other setups corresponding to individual users using tables different for respective users.

FIG. 9 is a flowchart of a process for displaying a window used to make copy and various other setups corresponding to each individual user using different tables for respective users. Note that a program according to the flowchart shown in FIG. 9 is saved in the storage unit 103, and this copying machine implements the process according to the flowchart of FIG. 9 when the control unit 104 reads out and executes that program onto its own work area.

Assume that the process shown in FIG. 9 is executed as a subroutine of a main process, and the window used to make copy and various other setups (e.g., that shown in FIG. 6) is already displayed on the display screen of the display unit 108.

Upon displaying the window or reloading (refreshing) the window on the display unit 108 (step S902), the table ID corresponding to the user ID, which is input in advance, is specified from the table shown in FIG. 2, and the M_IDs corresponding to "not available" and "recommended 1" in respective setup items are read from the table corresponding to the specified table ID (e.g., the table shown in FIG. 4). In addition, images corresponding to "recommended 1" and "not available" of those described in the table corresponding to the specified table ID (e.g., the table shown in FIG. 3) are read (step S903).

Images indicating "not available" and those indicating "recommended 1" corresponding to respective setup items are displayed near the GUI components of the respective setup items displayed on the display screen of the display unit 108 (step S904). With the above process, for example, the window shown in FIG. 7 is displayed on the display screen of the display unit 108.

Note that the above process can present the recommended input modalities and unavailable input modalities by means of speech as in the first embodiment. In this case, the following processes are made in steps S903 and S904 in the flowchart shown in FIG. 9.

In step S903, the table ID corresponding to the user ID, which is input in advance, is specified from the table shown in FIG. 2, and the M_IDs and speech recognition lexical items corresponding to "not available" and "recommended 1" in respective setup items are read from the table corresponding to the specified table ID (e.g., the table shown in FIG. 4). In addition, text data corresponding to "recommended 1" and "not available" of speech messages described in the table corresponding to the specified table ID (e.g., the table shown in FIG. 3) are read (step S903).

Speech data indicating "not available" and those indicating "recommended 1" corresponding to respective setup items are output as speech synthesis results according to the text data (step S904). As the speech contents, for example, "GUI is recommended for equal-magnification setup, speech is recommended for magnification setup, . . . " may be output.

As described above, according to the second embodiment, in addition to the first embodiment, since recommended input modalities can be presented for each user, an adequate operation method corresponding to the attribute or operation skill level of each individual user can be presented. For example, even when an input modality to be recommended is a GUI, this input modality should not be recommended for a vision-impaired user.

Therefore, the information processing apparatus according to this embodiment can prepare tables for such vision-impaired user in advance. As the tables for the vision-impaired user, a table obtained by omitting the "image" column from the table shown in FIG. 3, and a table in which all recommended input modalities in the table shown in FIG. 4 are speech (all M_IDs of "recommended 1" and "recommended 2" are M2) are preferably registered in the table shown in FIG. 2 in associated with the ID of the vision-impaired user. Then, recommended input modalities and unavailable input modalities can be presented to the vision-impaired user by speech using such tables.

Third Embodiment

Figure 10:
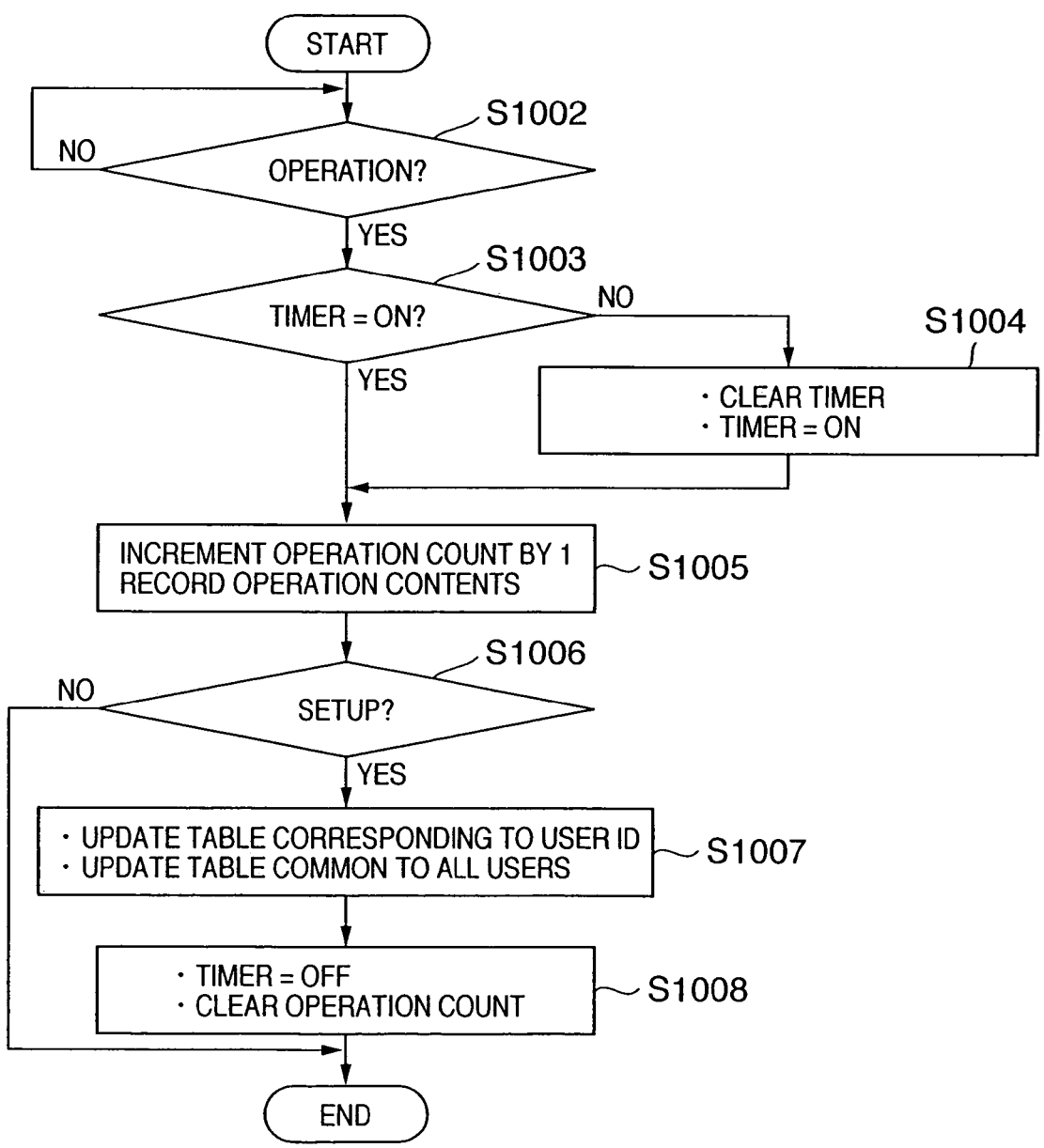
FIG. 10 is a flowchart of a process for dynamically changing a recommended input modality in accordance with the user's operation history.

In the first and second embodiments, recommended input modalities are set in advance. Alternatively, such modalities may be dynamically changed in accordance with the user's operation history. FIG. 10 is a flowchart of a process for dynamically changing recommended input modalities in correspondence with the user's operation history.

Note that a program according to the flowchart shown in FIG. 10 is saved in the storage unit 103, and this copying machine implements the process according to the flowchart of FIG. 10 when the control unit 104 reads out and executes that program onto its own work area.

Upon detection of an operation input using the operation unit 107 (step S1002), the status of an internal timer (not shown) of the control unit 104 is checked (step S1003). If the timer is OFF, the timer is cleared and is turned on (step S1004). Next, the operation count is incremented by 1, and the operation contents are additionally recorded in the table shown in FIG. 5 (step S1005). If no setup is made by this operation (step S1006), the process ends; otherwise (step S1006), the tables corresponding to the user ID which is input in advance (or is determined in advance) are updated, and the tables common to all the users are also updated (step S1007). Note that a score G is defined by:

$$G = 1/T + 1/F \qquad (1)$$

(T: operation time, F: operation count)

As the update process of the tables corresponding to the user ID in step S1007, a score G based on an operation count F and operation time T in the current operation sequence is compared with a score G' based on an operation count F' and operation time T' in the table (FIG. 4) in the current operation sequence, and the operation count, operation time, and its operation sequence (FIG. 5) with a lower score are updated by those with a higher score. If the two scores are equal to each other, the update process is skipped.

For example, when an automatic selection of paper sheets is set using the GUI (M_ID=M1), if the operation count F and operation time T of the current operation sequence are respectively 2 and 6, since a score G (=½+⅙=0.67) is higher than a score G (⅓+⅐=0.48) in the table corresponding to the user ID, the operation count=2, operation time=6, and operation sequence are written in "auto" in the setup item "paper sheet" in FIG. 4.

Since "operation count" or "operation time" has been updated, recommended modalities ("recommended 1" and "recommended 2" in the aforementioned table) are also updated. Upon updating the recommended modalities, a modality with a highest score G of respective modalities is set as new "recommended 1", and a modality with a second highest score G is set as new "recommended 2". If modalities having the same score are found, a modality which is referred to first is preferentially set. In the aforementioned example of setting automatic selection of paper sheets, after the score G of the GUI (M_ID=M1) is updated to 0.67 (=½+⅙) by the current operation sequence, it is compared with a score G (=½+⅓=0.83) of speech (M_ID=M2), speech (M_ID=M2) with a highest score G is set as "recommended 1", and the GUI as a modality with a second highest score G is set as "recommended 2" (in this example, since speech="recommended 1" and GUI="recommended 2", the update process is skipped).

Upon updating the tables common to all the users, the operation count, operation time, and operation sequence of a table with the highest score G of those of the respective users are written. If tables having the same score are found, the table which is referred to first is preferentially set. Alternatively, the average values of the operation counts and operation times in the tables of respective users (average values among users) may be calculated. In this case, the operation sequence of a table with the highest score G of those of respective users is written. If tables having the same score are found, the operation sequence of the table which is referred to first is preferentially set.

In the tables common to all the users, since "operation count" or "operation time" has been updated, recommended modalities ("recommended 1" and "recommended 2" in the aforementioned table) are also updated. Upon updating the recommended modalities, a modality with a highest score G of respective modalities is set as new "recommended 1", and a modality with a second highest score G is set as new "recommended 2". If modalities having the same score are found, a modality which is referred to first is preferentially set.

Upon completion of the update process, the timer is turned off to clear the operation count (step S1008).

Recommended modalities, unavailable modalities, and the like of the application are presented by the same method as in the first or second embodiment.

As described above, according to the third embodiment, since the recommended input modalities are dynamically set on the basis of the user's previous operation history in addition to the first and second embodiments, a more adequate operation method can be presented.

Fourth Embodiment

In the above embodiment, after a desired setup has been made using an available input modality, if a more recommended input modality is available after the setup, that input modality may be presented to the user.

Figure 12:
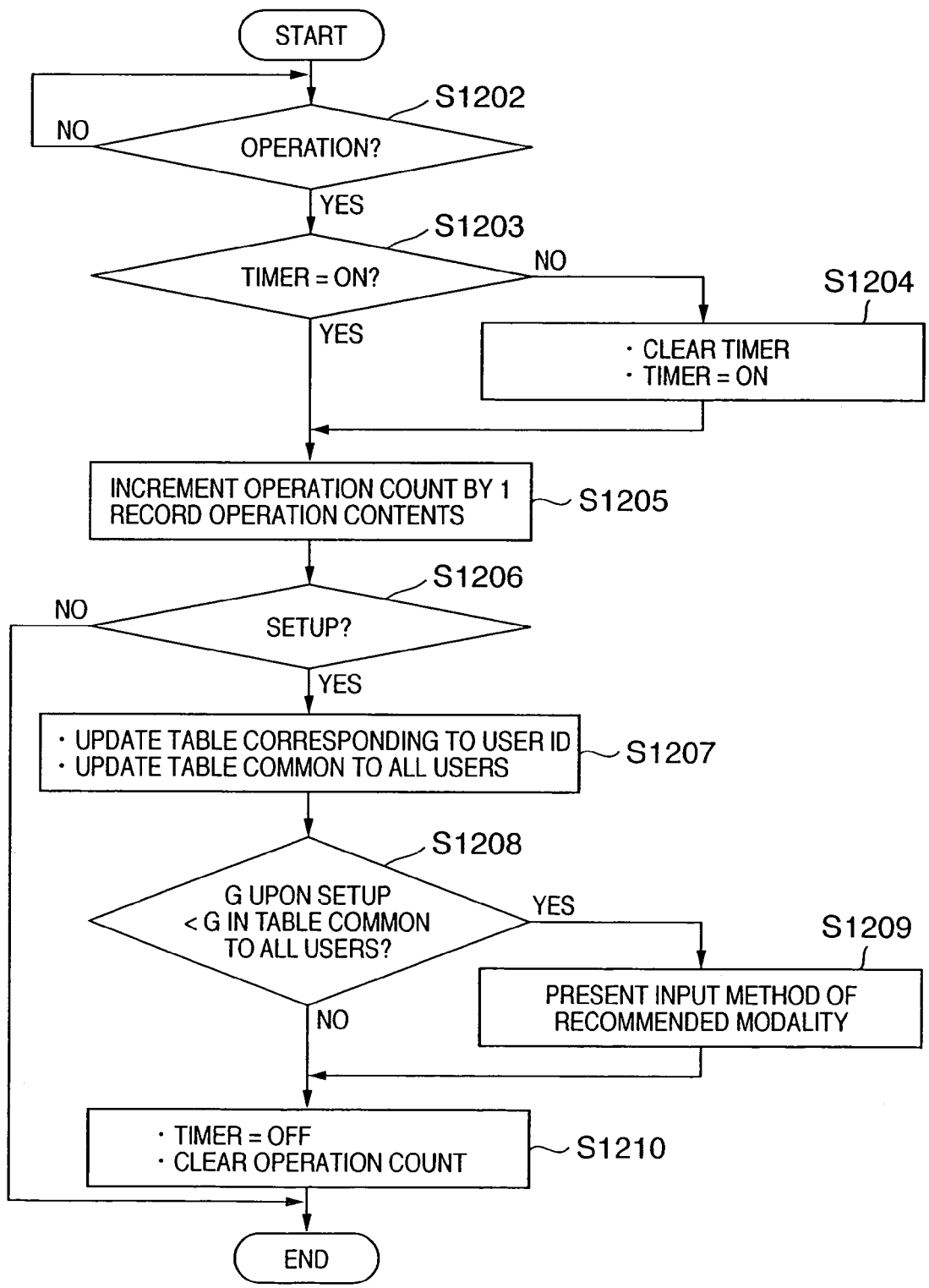
FIG. 12 is a flowchart of a process for presenting to the user, if any, more recommended input modality, after the user has made a desired setup.

FIG. 12 is a flowchart showing the process in this case. Note that a program according to the flowchart shown in FIG. 12 is saved in the storage unit 103, and this copying machine implements the process according to the flowchart of FIG. 12 when the control unit 104 reads out and executes that program onto its own work area.

In the flowchart shown in FIG. 12, steps S1202 to S1207, and step S1210 are respectively the same as steps S1002 to S1007 and step S1008 in FIG. 10. That is, the flowchart shown in FIG. 12 is substantially the same as that shown in FIG. 10, except that new steps S1208 and S1209 are added. Therefore, these steps S1208 and S1209 will be described below.

In step S1208, a score G based on an operation count F and operation time G in the current operation sequence is compared with a score G' based on an operation count F' and operation time T' of a modality as "recommended 1" corresponding to the setup item currently done by the user in the table common to all the users. If the current score G is lower than the score G' of the modality of "recommended 1" in the common table, the operation sequence of the modality of "recommended 1" in the common table is read, and this modality and operation sequence are set as a recommended modality and its operation sequence.

Figure 11:
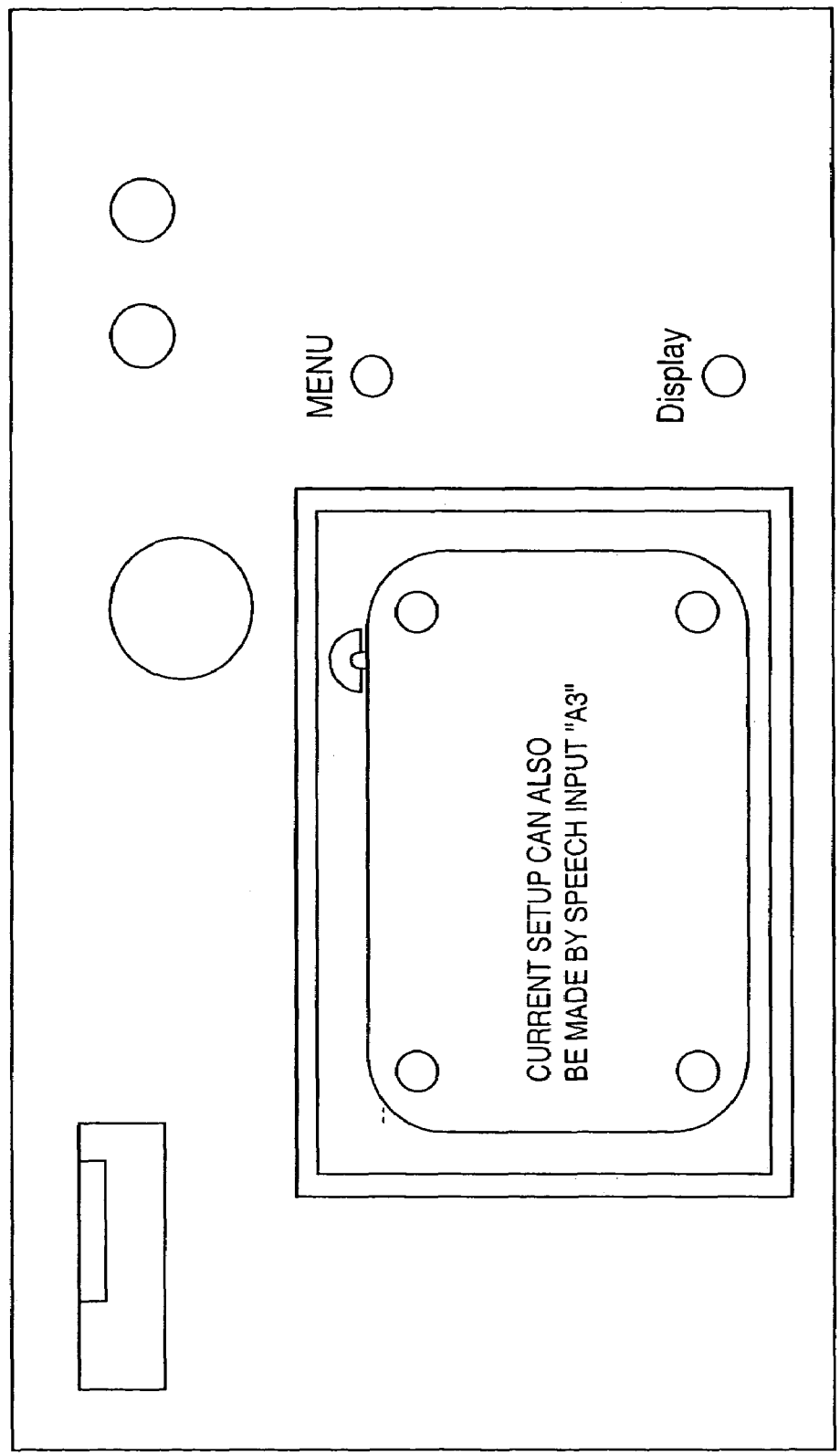
FIG. 11 shows an example of a window which presents that a speech input "A3" is also available for the operation done by the user.

If the current score G is lower than the score G' of the modality of "recommended 1" in the common table, the operation sequence (FIG. 5) of the recommended modality is presented, as shown in FIG. 11, in step S1209. If the current score G is equal to or higher than the score G' of the modality of "recommended 1" in the common table (NO in step S1208), the aforementioned presentation step is skipped.

FIG. 11 shows an example of a window which presents that a speech input "A3" is also available for the operation done by the user. For example, when the user sets A3 as a paper size with an operation count=2 and operation time=5 using the GUI, a score at that time is ½+⅕=0.7. By contrast, the score of a modality (speech, M_ID+M2) of "recommended 1" in the table common to the users is ½+⅓=0.83. Since the current score=0.7 is lower than the score=0.83 of the modality of "recommended 1", speech is set as a recommended modality, its operation sequence is set as L221, and a recommended method is presented, as shown in FIG. 11.

Note that the operation sequence (FIG. 5) based on the recommended modality may be output as a speech message from the speech output unit 106. For example, a message "the current setup can also be made by inputting speech A3" is read aloud. As for the speech output, an existing speech synthesis technique is used.

As described above, according to the fourth embodiment, since a recommended method which is more suitable than the setup method done by the user is presented after the user makes the setup, the user can make that setup by a more suitable method from the next operation.

Fifth Embodiment

In the description of the first to fourth embodiments, the information processing apparatus is applied to the copying machine. In this embodiment, the information processing apparatus is applied to a digital camera. Of course, the digital camera according to this embodiment has a multimodal user interface.

When the information processing apparatus is applied to the digital camera, a table shown in FIG. 13 is used in place of that shown in FIG. 4. FIG. 13 shows an example of the configuration of a new table to be stored in the storage unit 103 when the information processing apparatus according to this embodiment is applied to the digital camera. The table shown in FIG. 13 describes "setup item" of the digital camera, and "operation count", "operation time", "operation sequence", "available", "not available", "recommend 1", "recommend 2", and "speech recognition lexical item" for each setup item. This table will be described in more detail below using FIG. 13.

The table shown in FIG. 13 has different setup items from those of the table shown in FIG. 4, and other descriptions also differ according to these setup items. However, the method of using this table is substantially the same as that of the table shown in FIG. 4.

Figure 14:
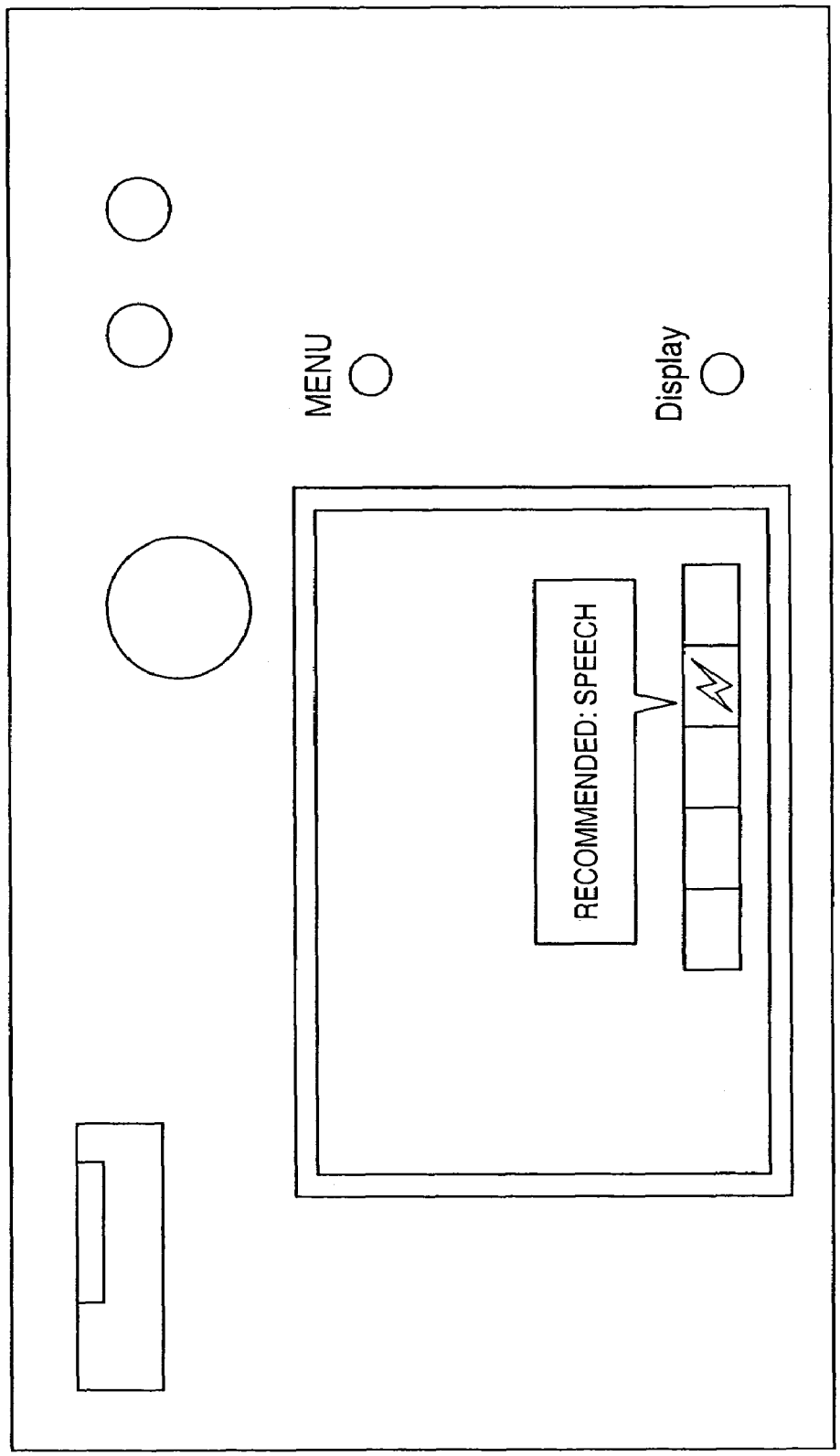
FIG. 14 shows a window example that displays an image indicating a recommended input modality on a setup window displayed on a display unit of the digital camera.
Figure 15:
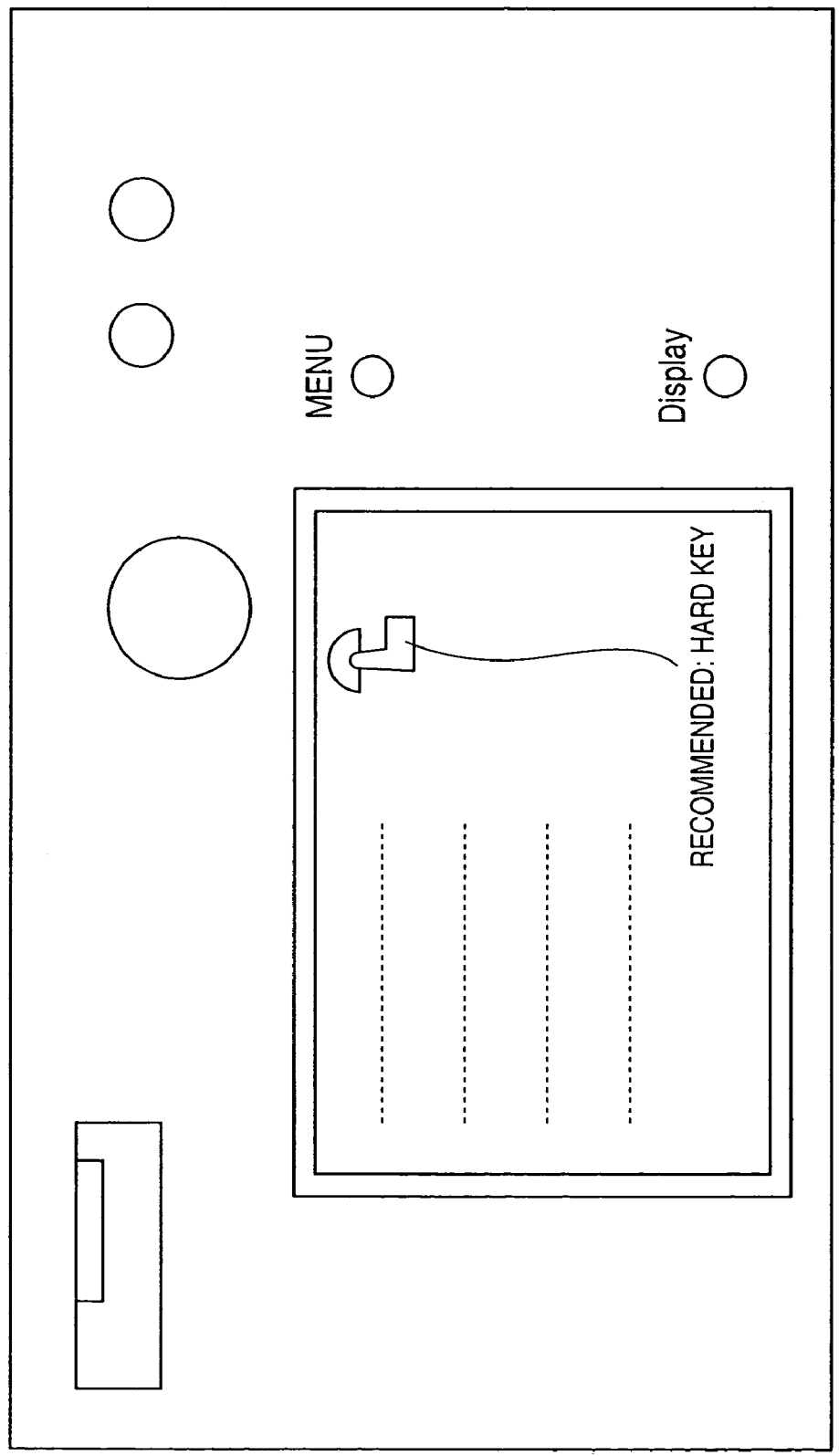
FIG. 15 shows a window example that displays an image indicating a recommended input modality on the setup window displayed on the display unit of the digital camera.

FIGS. 14 and 15 show examples of windows that display images indicating recommended modalities on the setup window displayed on a display unit of the digital camera. On these windows, images indicating recommended input modalities (an image indicating that a recommended input modality is speech in FIG. 14; an image indicating that a recommended input modality is a hard key in FIG. 15) are displayed as in the above embodiment.

In this embodiment, a recommended input modality may be presented to the user by speech in the same manner as in the above embodiments.

In a device with a small screen like a digital camera, LEDs (light-emitting diodes) or the like may be attached to the device, and an LED corresponding to a recommended modality in each individual operation may be turned on. For example, when a menu button is pressed, a menu is displayed on a GUI window. At this time, a recommended input modality LED (e.g., a speech LED if speech is recommended) upon menu selection is turned on. In another method, an LED of a color corresponding to each input modality may be turned on.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores the program codes corresponding to the aforementioned flowcharts.

As described above, according to the present invention, an input process of information using a multimodal user interface can be facilitated.

As many apparently widely different embodiments of the present invention can be made without departing from the spirit and scope thereof, it is to be understood that the invention is not limited to the specific embodiments thereof except as defined in the claims.

What is claimed is:

1. An information processing method executed by an information processing apparatus which has a display screen for displaying a menu window in which a plurality of selectable items are arranged, wherein information can be input to the information processing apparatus by using one of a plurality of input modalities after designating one of the plurality of selectable items, comprising:
   a read step of reading, from a storage unit, item information for each of the plurality of selectable items, wherein the item information for a single selectable item is for specifying a plurality of available input modalities for inputting information after designating the single selectable item so as to be capable of identifying a recommendation level of each of the plurality of available input modalities; and
   a display step of displaying symbol images, each of which being displayed so as to be attached to a corresponding selectable item displayed in the display screen, wherein a single symbol image is an image corresponding to a type of an input modality determined by referring to each recommendation level specified by the item information read in the read step, of a corresponding selectable item to which the single symbol image is attached.

2. The information processing method according to claim 1, wherein in the display step, the single symbol image is displayed in a size corresponding to the recommendation level of the determined input modality.

3. The information processing method according to claim 1, further comprising:
   an identification step of identifying a user on the basis of input personal information,
   wherein the storage unit manages item information for each of the plurality of selectable items, for each user, and
   in the read step, item information for each of the plurality of selectable items is read out in accordance with the user identified in the identification step.

4. The information processing method according to claim 1, wherein the recommendation level of the single input modality is determined according to operation time and operation count which are required to input information by using the single input modality.

5. A computer-readable storage medium storing a computer-executable program allowing a computer to execute the information processing method according to claim 4.

6. A computer-readable storage medium storing a computer-executable program allowing a computer to execute the information processing method according to claim 1.

7. An information processing method executed by an information processing apparatus which has a display screen for displaying a menu window in which a plurality of selectable items are arranged, wherein information can be input to the information processing apparatus by using one of a plurality of input modalities after designating one of the plurality of selectable items, comprising:
   a read step of reading, from a storage unit, item information for each of the plurality of selectable items, wherein the item information for a single selectable item is for specifying a plurality of available input modalities for inputting information after designating the single selectable item so as to be capable of identifying a recommendation level of each of the plurality of available input modalities; and
   a display step of displaying symbol images, each of which being displayed so as to be attached to a corresponding selectable item displayed in the display screen, wherein a single symbol image is an image corresponding to a type of an input modality determined by referring to each recommendation level specified by the item information read in the read step, of a corresponding selectable item to which the single symbol image is attached, and
   wherein in the display step, the single symbol image is displayed in a size corresponding to the recommendation level of the determined input modality, and the recommendation level of the single input modality is determined according to operation time and operation count which are required to input information by using the single input modality.

8. An information processing apparatus which has a display screen for displaying a menu window in which a plurality of selectable items are arranged, wherein information can be input to the information processing apparatus by using one of a plurality of input modalities after designating one of the plurality of selectable items, comprising:

a read unit for reading, from a storage unit, item information for each of the plurality of selectable items, wherein the item information for a single selectable item is for specifying a plurality of available input modalities for inputting information after designating the single selectable item so as to be capable of identifying a recommendation level of each of the plurality of available input modalities; and a display unit for displaying symbol images, each of which being displayed so as to be attached to a corresponding selectable item displayed in the display screen, wherein a single symbol image is an image corresponding to a type of an input modality determined by referring to each recommendation level specified by the item information read by the reading unit, of a corresponding selectable item to which the single symbol image is attached.

9. An information processing apparatus which has a display screen for displaying a menu window in which a plurality of selectable items are arranged, wherein information can be input to the information processing apparatus by using one of a plurality of input modalities after designating one of the plurality of selectable items, comprising:

a read unit for reading, from a storage unit, item information for each of the plurality of selectable items, wherein the item information for a single selectable item is for specifying a plurality of available input modalities for inputting information after designating the single selectable item so as to be capable of identifying a recommendation level of each of the plurality of available input modalities; and a display unit for displaying symbol images, each of which being displayed so as to be attached to a corresponding selectable item displayed in the display screen, wherein a single symbol image is an image corresponding to a type of an input modality determined by referring to each recommendation level specified by the item information read by the reading unit, of a corresponding selectable item to which the single symbol image is attached, and wherein, in the display unit, the single symbol image is displayed in a size corresponding to the recommendation level of the determined input modality, and the recommendation level of the single input modality is determined according to operation time and operation count which are required to input information by using the single input modality.

* * * * *